US009787207B2

(12) United States Patent
Baumann et al.

(10) Patent No.: US 9,787,207 B2
(45) Date of Patent: Oct. 10, 2017

(54) ELECTRIC MACHINE AND USE THEREOF

(71) Applicant: SIEMENS AKTIENGESELLSCHAFT, Munich (DE)

(72) Inventors: Markus Baumann, Fuerth (DE); Reinhold Beck, Leutershausen (DE); Daniel Hoermann, Nuremberg (DE); Catherine Prinz, Erlangen (DE); Andre Silbernagel, Nuremberg (DE); Ingo Gerd Zehner, Zirndorf (DE)

(73) Assignee: Siemens Aktiengesellschaft, Munich (DE)

( * ) Notice: Subject to any disclaimer, the term of this patent is extended or adjusted under 35 U.S.C. 154(b) by 338 days.

(21) Appl. No.: 14/705,411

(22) Filed: May 6, 2015

(65) Prior Publication Data
US 2015/0326135 A1 Nov. 12, 2015

(30) Foreign Application Priority Data

May 6, 2014 (EP) ..................................... 14167214

(51) Int. Cl.
*H01F 1/00* (2006.01)
*H02M 5/10* (2006.01)
(Continued)

(52) U.S. Cl.
CPC ................ *H02M 5/10* (2013.01); *B60L 9/00* (2013.01); *B60L 9/005* (2013.01); *B60L 9/14* (2013.01);
(Continued)

(58) Field of Classification Search
None
See application file for complete search history.

(56) References Cited

U.S. PATENT DOCUMENTS

| 4,592,133 | A | * | 6/1986 | Grimes | .................... H01F 41/02 242/434.7 |
| 4,777,465 | A | * | 10/1988 | Meinel | ................ H01F 17/0033 257/E25.031 |
| 6,867,674 | B1 | * | 3/2005 | Schutte | ............... H01F 27/2823 336/180 |
| 2007/0268103 | A1 | * | 11/2007 | Fushimi | .................... H01F 3/10 336/145 |

(Continued)

FOREIGN PATENT DOCUMENTS

| CN | 101964246 A | 2/2011 |
| CN | 102360803 A | 2/2012 |

(Continued)

*Primary Examiner* — Tuan T Lam
(74) *Attorney, Agent, or Firm* — Laurence Greenberg; Werner Stemer; Ralph Locher

(57) ABSTRACT

An electric machine is selectively operated as a transformer for AC voltage operation or as a throttle system for DC voltage operation. A transformer core has two limbs. An additional winding with a first additional partial winding is wound around a first limb and a second additional winding is wound around the second limb. A higher-voltage winding with a first higher-voltage partial winding is wound around the first additional partial winding and a second higher-voltage partial winding is wound around the second additional partial winding. A first traction winding is wound around the first higher-voltage partial winding and a second traction winding is wound around the second higher-voltage partial winding. A first DC voltage winding may be wound around the first traction winding and a second DC voltage winding may be wound around the second traction winding.

10 Claims, 3 Drawing Sheets

(51) Int. Cl.
  *H01F 27/24* (2006.01)
  *H01F 27/28* (2006.01)
  *H02M 3/04* (2006.01)
  *B60L 9/00* (2006.01)
  *B60L 9/14* (2006.01)
  *B60L 9/30* (2006.01)
  *H01F 27/38* (2006.01)
  *H01F 27/30* (2006.01)
  *H01F 38/02* (2006.01)

(52) U.S. Cl.
  CPC ................ *B60L 9/30* (2013.01); *H01F 27/24* (2013.01); *H01F 27/28* (2013.01); *H01F 27/38* (2013.01); *H02M 3/04* (2013.01); *H01F 27/306* (2013.01); *H01F 2038/026* (2013.01); *Y02T 90/124* (2013.01); *Y10T 29/4902* (2015.01); *Y10T 29/49071* (2015.01); *Y10T 29/49073* (2015.01)

(56) References Cited

U.S. PATENT DOCUMENTS

| | | | | |
|---|---|---|---|---|
| 2007/0285203 A1* | 12/2007 | Ger | ........................ | H01F 27/325 336/208 |
| 2009/0257560 A1* | 10/2009 | Khutoryansky | ........ | H01F 30/12 378/101 |
| 2015/0213945 A1* | 7/2015 | Noda | .................... | H01F 27/346 336/170 |

FOREIGN PATENT DOCUMENTS

| | | |
|---|---|---|
| CN | 103754123 A | 4/2014 |
| EP | 1315180 A1 | 5/2003 |
| EP | 1685575 B1 | 12/2008 |
| FR | 2881266 A1 | 7/2006 |
| GB | 2408634 A | 6/2005 |
| WO | 2009132675 A1 | 11/2009 |

* cited by examiner

ELECTRIC MACHINE AND USE THEREOF

CROSS-REFERENCE TO RELATED APPLICATION

This application claims the priority, under 35 U.S.C. §119, of European patent application No. EP 14167214.7, filed May 6, 2014; the prior application is herewith incorporated by reference in its entirety.

BACKGROUND OF THE INVENTION

Field of the Invention

The invention relates to an electric machine for optional operation as a transformer for AC voltage operation or as a throttle system for DC operation. Furthermore, the invention relates to a use of an electric machine of this type.

Large area railway systems often are locally electrified to different standards. By way of example, the European railway power system currently consists of four different voltage systems, namely a system with an AC voltage with 15 kV and 16.67 Hz, a system with an AC voltage with 25 kV and 50 Hz, a system with a DC voltage with 3 kV and a system with a DC voltage with 1.5 kV. To enable a train to travel across all the countries with these four voltage systems, vehicle drives are used which have a transformer active part for AC voltage operation with 15 kV and 25 kV and in addition throttles for DC voltage operation with 3 kV and 1.5 kV with a specific inductance. This inductance during DC voltage operation is required so as to comply with the input impedance requirements, electromagnetic compatibility and interference current limit values of the train operator and the legal and normative regulations. In the past, the transformer active part was not connected during DC voltage operation and only the separate throttles were used. During AC voltage operation, the transformer active part was connected and the throttles were not used.

SUMMARY OF THE INVENTION

It is accordingly an object of the invention to provide a electric machine which overcomes a variety of disadvantages of the heretofore-known devices and methods of this general type and which provides for an improved electric machine for optional operation as a transformer for AC voltage operation or as a throttle system for DC voltage operation. The object underlying the invention is also to specify the use of an electric machine of this type in a vehicle, the vehicle drive of which is optionally supplied with electrical energy by way of an external AC voltage or DC voltage.

With the foregoing and other objects in view there is provided, in accordance with the invention, a electric machine for selective operation as a transformer for AC voltage operation or as a throttle system for DC voltage operation, the electric machine comprising:
a transformer core with two limbs including a first limb and a second limb;
an additional winding with a first additional partial winding wound around first limb and a second additional partial winding electrically connected to first additional partial winding and wound around second limb of transformer core;
a higher-voltage winding with a first higher-voltage partial winding wound around first additional partial winding and a second higher-voltage partial winding electrically connected to first higher-voltage partial winding and wound around second additional partial winding;
a first traction winding wound around first higher-voltage partial winding, and a second traction winding wound around second higher-voltage partial winding.

In other words, an electric machine according to the invention, for optional operation as a transformer for AC voltage operation or as a throttle system for DC voltage operation, includes a transformer core with two limbs, a higher-voltage winding, two traction windings and an additional winding. The additional winding includes a first additional partial winding wound around a first limb of the transformer core and a second additional partial winding electrically connected to the first additional partial winding and wound around the second limb of the transformer core. The higher-voltage winding includes a first higher-voltage partial winding wound around the first additional partial winding and a second higher-voltage partial winding electrically connected to the first higher-voltage partial winding and wound around the second additional partial winding. The first traction winding is wound around the first higher-voltage partial winding. The second traction winding is wound around the second higher-voltage partial winding.

For operation as a transformer in AC voltage operation, only the higher-voltage winding and the traction windings are required. The additional winding is only required during DC voltage operation. During DC voltage operation, the traction windings can be used as network filter throttles for a DC voltage drive train of the vehicle drive. In this way, additional throttles can advantageously be dispensed with for DC voltage operation. The use of an inventive electric machine in a vehicle allows for a weight reduction compared with electric machines with additional throttles for DC voltage operation and the electric machine can be built to be smaller, lighter and more cost-effective.

One embodiment of the invention provides for a first DC voltage winding wound around the first traction winding and a second DC voltage winding wound around the second traction winding.

The DC voltage windings can advantageously be electrically connected in series with a traction winding in each case during DC voltage operation in order if necessary to increase the inductances compared with the traction windings alone. In this way the inductances during DC voltage operation can advantageously be adjusted to input impedance requirements, electromagnetic compatibility and interference limit values, legal specifications and/or normative regulations.

In accordance with an added feature of the invention, the transformer core is manufactured from a ferromagnetic or ferrimagnetic material.

On account of their magnetic properties, ferromagnetic or ferrimagnetic materials are particularly advantageously suited to manufacturing the transformer core.

In accordance with an additional feature of the invention, the additional partial windings are electrically connected in series.

As a result, only two feed-throughs are advantageously required for contacting the additional partial windings.

In accordance with another feature of the invention, the higher-voltage partial windings are electrically connected in parallel.

As a result, the traction windings are advantageously magnetically decoupled during AC voltage operation.

Further embodiments of the invention provide for at least two first additional partial windings arranged one behind the other along the first limb and wound in each instance around the first limb, for each first additional partial winding a first higher-voltage partial winding wound around this first additional partial winding and for each first higher-voltage partial winding a first traction winding wound around this first higher-voltage partial winding and/or at least two second additional partial windings arranged one behind the other along the second limb and wound in each instance around the second limb, for each second additional partial winding a second higher-voltage partial winding wound around this second additional partial winding and for each second higher-voltage partial winding a second traction winding wound around this second higher-voltage partial winding.

The number of traction windings can as a result be advantageously adjusted to the respective requirements.

With the above and other objects in view there is also provided, in accordance with the invention, an inventive electric machine in a vehicle with a vehicle drive optionally supplied with electrical energy by means of an external AC voltage or DC voltage. During AC voltage operation, the external AC voltage is applied to the higher-voltage winding, the additional winding is grounded on one side and otherwise remains electrically unconnected and the traction windings are connected in each instance to a current converter for the vehicle drive. During DC voltage operation, the higher-voltage winding is grounded on one side and otherwise remains electrically unconnected, the additional winding is short-circuited and grounded on one side and the traction windings are connected in each instance as a network filter throttle for a DC voltage drive train of the vehicle drive.

This use of an inventive electric machine is particularly advantageously suited to vehicles driven optionally by means of an external AC voltage or DC voltage on account of the omission of additional throttles for the DC voltage operation as illustrated above, said vehicles being configured in as light and/or space-saving a fashion as possible. This use is particularly suited to vehicles which are embodied as rail cars or electric locomotives of trains.

In the event that the electric machine has a first DC voltage winding wound around the first traction winding and a second DC voltage winding wound around the second traction winding, the DC voltage windings are preferably grounded on one side and otherwise remain electrically unconnected during AC voltage operation and during DC voltage operation at least one DC voltage winding is electrically connected in series with a traction winding.

As was already cited above, the inductance can be increased alone in relation to the traction winding by the series connection at least of a DC voltage winding and a traction winding during DC voltage operation and adjusted to input impedance requirements, electromagnetic compatibility and interference current limit values, legal specifications and/or normative regulations.

One embodiment of the use provides that the vehicle drive is supplied with electrical energy in each instance via a catenary line system during AC voltage operation by means of an external AC voltage and during DC voltage operation with an external DC voltage.

This embodiment focuses in particular on the use of the invention for trains which are optionally to be powered by means of an external AC voltage or DC voltage.

Other features which are considered as characteristic for the invention are set forth in the appended claims.

Although the invention is illustrated and described herein as embodied in a electric machine and use thereof, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

Mutually corresponding and equivalent parts and elements are provided with the same reference numerals throughout the figures.

DETAILED DESCRIPTION OF THE INVENTION

Figure 1:
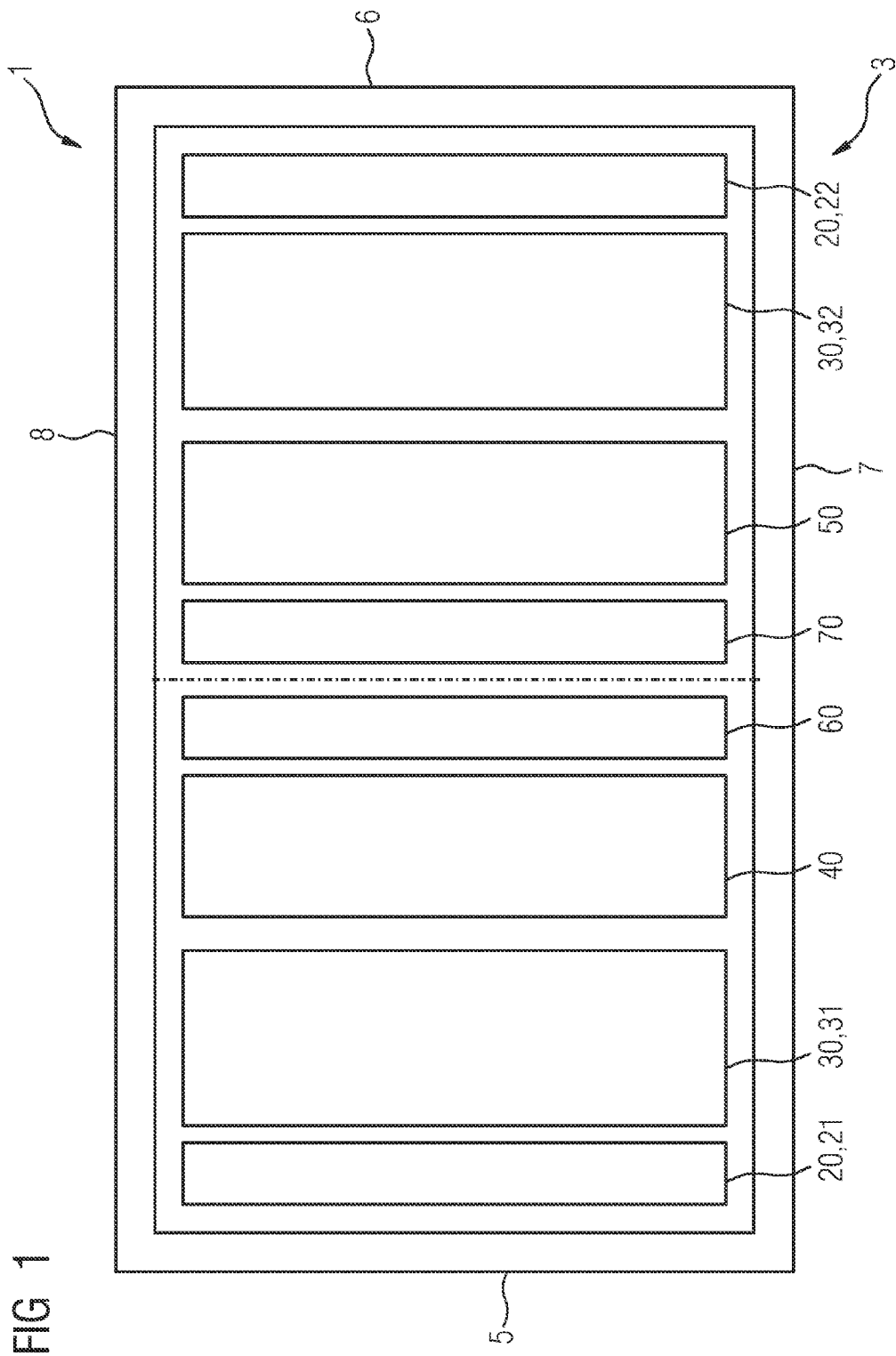
FIG. 1 shows a schematic sectional representation of an electric machine.

Referring now to the figures of the drawing in detail and first, particularly, to FIG. 1 thereof, there is shown a schematic sectional representation of an electric machine 1. The electric machine 1 includes a transformer core 3 with two limbs 5, 6 which are parallel to one another, and which are connected to one another by two yokes 7, 8 which are parallel to one another. A number of windings 20, 30, 40, 50, 60, 70 which are described in more detail below are wound around each limb 5, 6. FIG. 1 only shows regions between the limbs 5, 6, in which the windings 20, 30, 40, 50, 60, 70 each proceed, but not individual conductors or turns of the windings 20, 30, 40, 50, 60, 70. Furthermore, the regions of the windings 20, 30, 40, 50, 60, 70 which correspond thereto are not shown, which in the plane of the drawing connect to the two outer sides of the limbs 5, 6, i.e. are found to the left and to the right of the transformer core 3.

The limbs 5, 6 and the yokes 7, 8 of the transformer core 3 are preferably manufactured from a ferromagnetic or ferrimagnetic material.

The windings 20, 30, 40, 50, 60, 70 comprise: an additional winding 20, a higher-voltage winding 30, two traction windings 40, 50 and two DC voltage windings 60, 70.

The additional winding 20 includes a first additional partial winding 21 wound around a first limb 5 of the transformer core 3 and a second additional partial winding 22 preferably electrically connected in series with the first additional partial winding 5 and wound around the second limb 6 of the transformer core 3.

The higher-voltage winding 30 includes a first higher-voltage partial winding 31 wound around the first additional partial winding 21 and a second higher-voltage partial winding 32 electrically connected in parallel with the first higher-voltage partial winding 31 and wound around the second higher-voltage partial winding 32.

A first traction winding 40 is wound around the first higher-voltage partial winding 31. The second traction winding 50 is wound around the second higher-voltage partial winding 32.

A first DC voltage winding 60 is wound around the first traction winding 40. The second DC voltage winding 70 is wound around the second traction winding 50.

Here the first additional partial winding 21, the first higher-voltage partial winding 31, the first traction winding 40 and the first DC voltage winding 60 are wound concentrically around the first limb 5.

The second additional partial winding 22, the second higher-voltage partial winding 32, the second traction winding 50 and the second DC voltage winding 70 are wound concentrically around the second limb 6.

Figure 2:
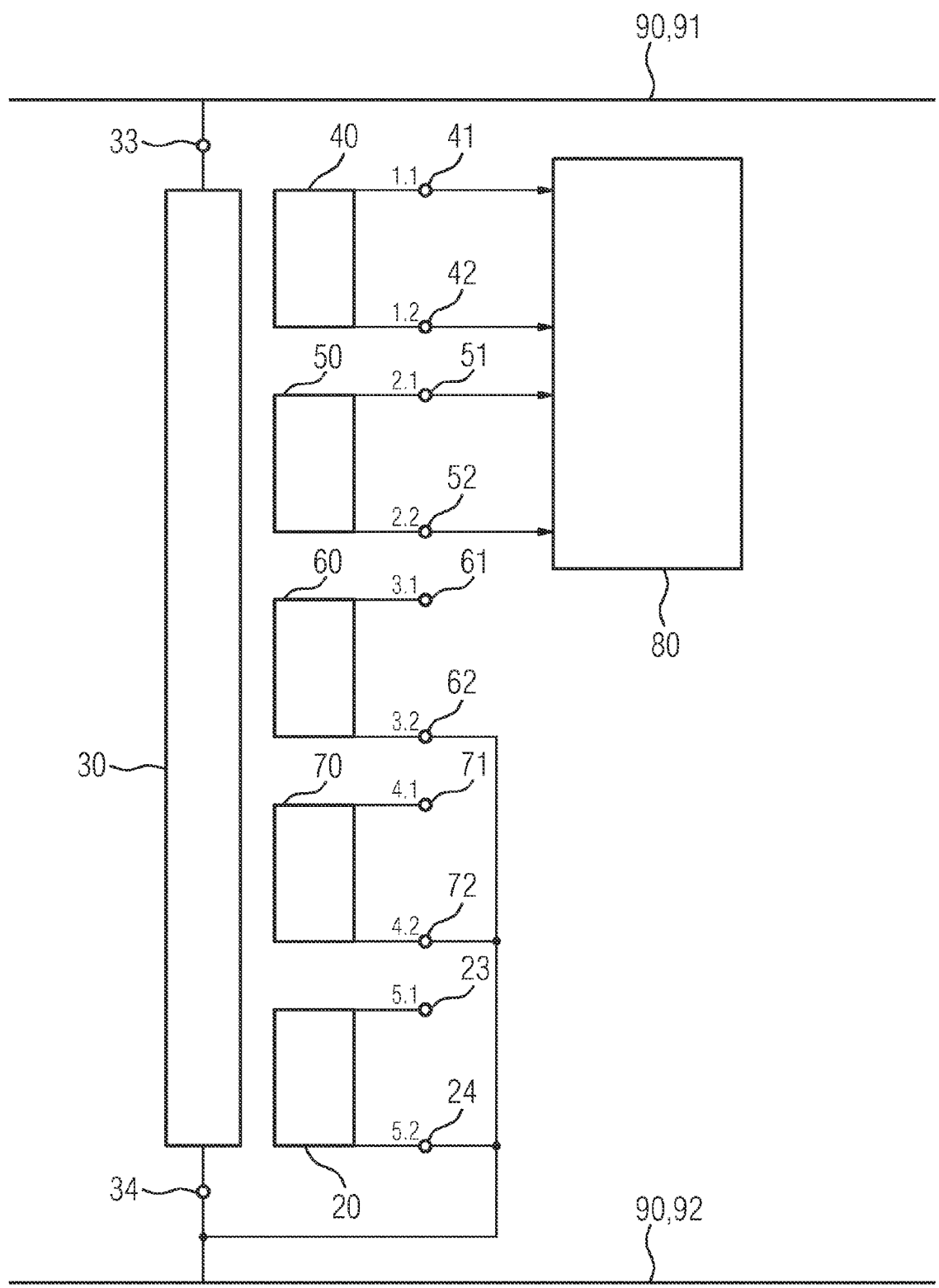
FIG. 2 shows a schematic representation of a connection of the windings of an electric machine during AC voltage operation.
Figure 3:
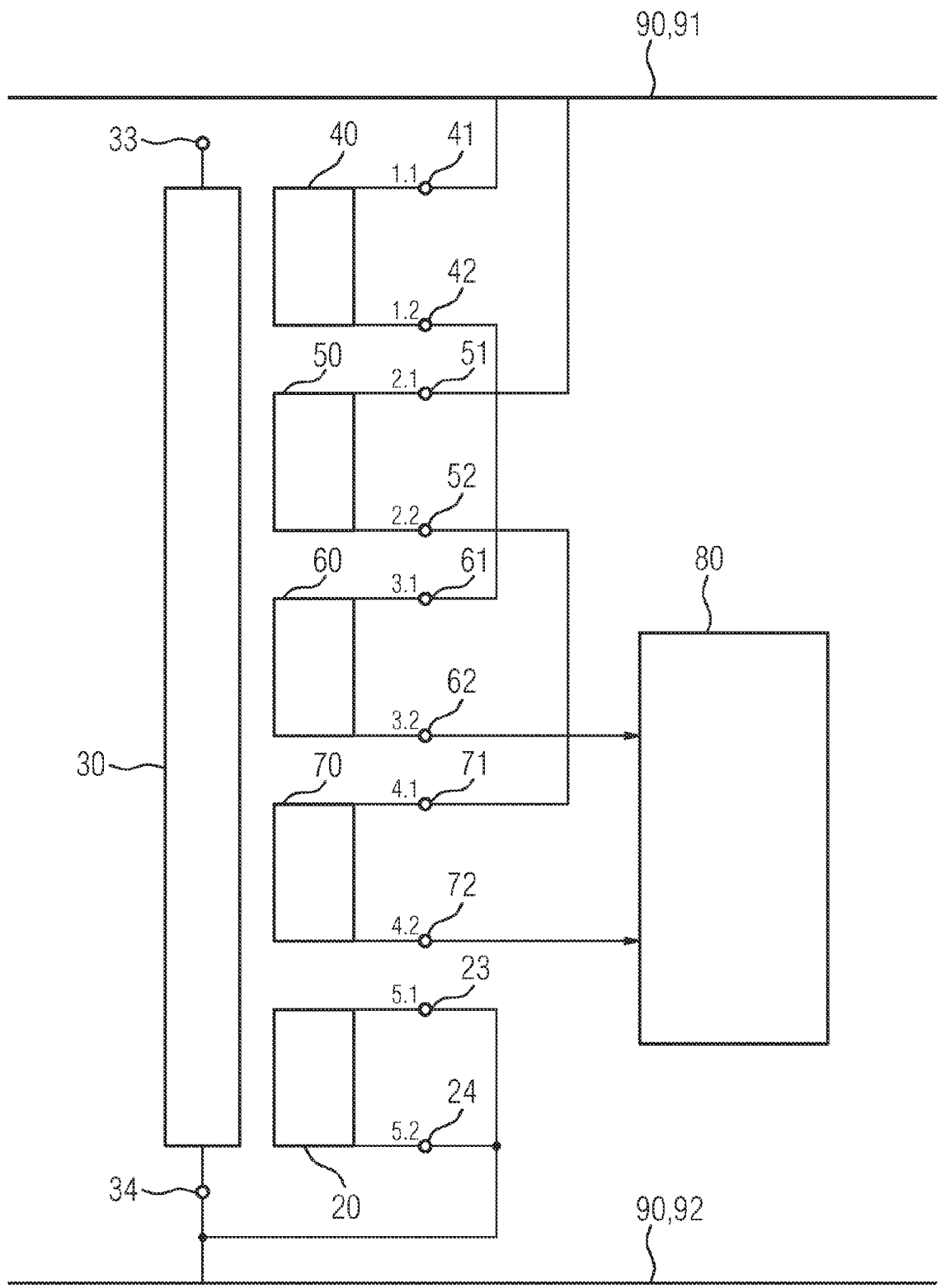
FIG. 3 shows a schematic representation of a connection of the windings of an electric machine during DC voltage operation.

FIGS. 2 and 3 each show a schematic representation of a connection of the windings 20, 30, 40, 50, 60, 70 of the electric machine 1 shown in FIG. 1. FIG. 2 thereby illustrates AC voltage operation and FIG. 3 illustrates DC voltage operation. Here the electric machine 1 is used in a vehicle which has a vehicle drive 80, which is optionally supplied with electrical energy by means of an external AC voltage or an external DC voltage via in each instance a catenary line system 90. The catenary line system 90 includes for instance a catenary line 91, which is embodied for instance as an overhead line, and a grounded return line 92, which is realized for instance as a railway track. The AC voltage or DC voltage is present between the catenary line 91 and the return line 92 in each instance.

FIG. 2 shows the connection of the windings 20, 30, 40, 50, 60, 70 during AC voltage operation of the electric machine 1.

Here a first end of the higher-voltage winding 30 is electrically connected to the catenary line 91 by way of a first higher-voltage winding terminal 33 and a second end of the higher-voltage winding 30 is connected to the return line 92 via a second higher-voltage winding terminal 34.

The first traction winding 40 is connected at a first end via a first traction winding terminal 41 and at a second end via a second traction winding terminal 42 to a current converter (not shown in more detail) for the vehicle drive 80. The second traction winding 50 is connected at a first end via a third traction winding terminal 51 and at a second end via a fourth traction winding terminal 52 to a current converter (not shown in more detail) for the vehicle drive 80.

The first DC voltage winding 60 is only electrically connected to the return line 92 via a second DC voltage winding terminal and is as a result grounded on one side, and otherwise remains electrically unconnected. The second DC voltage winding 70 is only electrically connected to the return line 92 via a second DC voltage winding terminal 72 and is as a result grounded on one side, and otherwise remains electrically unconnected. The additional winding 20 is only electrically connected to the return line 92 via a second additional winding terminal 24 and is as a result grounded on one side, and otherwise remains electrically unconnected.

FIG. 3 shows the connection of the windings 20, 30, 40, 50, 60, 70 during DC voltage operation of the electric machine 1.

The higher-voltage winding 30 is only electrically connected to the return line 92 via the second higher-voltage winding terminal 34 and is as a result grounded on one side and otherwise remains electrically unconnected.

The additional winding 20 is short-circuited by an electrical connection between the two additional winding terminals 23, 24, and is connected to the return line 92 via the second additional winding terminal 24 and is as a result grounded.

The first traction winding 40 is electrically connected to the catenary line 91 via the first traction winding terminal 41, and to the first DC voltage winding 60 via the second traction winding terminal 42 and the first DC voltage winding terminal 61. The first DC voltage winding 60 is also electrically connected to a DC voltage drive train (not shown in more detail) of the vehicle drive 80 via the second DC voltage winding terminal 62. As a result, the first traction winding 40, the first DC voltage winding 60 and its terminals 41, 42, 61, 62 operate as a network filter throttle for the DC voltage drive train of the vehicle drive 80.

The second traction winding 50 is electrically connected to the catenary line 91 by way of the third traction winding terminal 51, and to the second DC voltage winding 70 by way of the fourth traction winding terminal 52 and the third DC voltage winding terminal 71. The second DC voltage winding 70 is also electrically connected to a DC voltage drive train (not shown in more detail) of the vehicle drive 80 via the fourth DC voltage winding terminal 72. As a result, the second traction winding 50, the second DC voltage winding 70 and its terminals 51, 52, 71, 72 similarly operate as a network filter throttle for the DC voltage drive train of the vehicle drive 80.

Alternatively to the exemplary embodiment shown in FIGS. 1 to 3, the DC voltage windings 60, 70 can be omitted in other exemplary embodiments for instance, if due to the traction windings 40, 50 alone, network filter throttles with sufficient inductances can already be realized for the DC voltage operation and/or a traction winding 40, 50 can only be wound around the respective higher-voltage partial winding 31, 32 on each limb 5, 6.

The vehicle is for instance a rail car or an electric locomotive of a train, generally referred to as a multi-system electric locomotive (i.e., one that can operate in more than one railway electrification system). To operate such a vehicle in the different voltage systems (e.g., in the above-mentioned European traction power system, or in the Metro North rail system), the electric machine 1 is configured to convert AC voltages with 15 kV or 25 kV into AC voltages required by the vehicle drive 80 during AC voltage operation, and during DC voltage operation to realize network filter throttles with the required inductances for DC voltages with 3 kV and/or 1.5 kV by means of the traction windings 40, 50 and (optionally) the DC voltage windings 60, 70.

Although the invention has been illustrated and described in greater detail on the basis of preferred exemplary embodiments, the invention is not limited by the disclosed examples and other variations can be derived herefrom by the person skilled in the art without leaving the scope of protection of the invention.

The invention claimed is:

1. An electric machine for selective operation as a transformer for AC voltage operation or as a throttle system for DC voltage operation, the electric machine comprising:
    a transformer core with two limbs including a first limb and a second limb;
    an additional winding with a first additional partial winding wound around said first limb and a second additional partial winding electrically connected to said first additional partial winding and wound around said second limb of said transformer core;
    a higher-voltage winding with a first higher-voltage partial winding wound around said first additional partial winding and a second higher-voltage partial winding electrically connected to said first higher-voltage partial winding and wound around said second additional partial winding;

a first traction winding wound around said first higher-voltage partial winding, and a second traction winding wound around said second higher-voltage partial winding.

2. The electric machine according to claim 1, further comprising a first DC voltage winding wound around said first traction winding and a second DC voltage winding wound around said second traction winding.

3. The electric machine according to claim 1, wherein said transformer core is formed of a ferromagnetic material or a ferrimagnetic material.

4. The electric machine according to claim 1, wherein said first additional partial winding and said second additional partial winding are electrically connected in series.

5. The electric machine according to claim 1, wherein said first higher-voltage partial winding and said second higher-voltage partial winding are electrically connected in parallel.

6. The electric machine according to claim 1, wherein:
    said first additional partial winding is one of at least two first additional partial windings arranged one behind another along said first limb and wound around said first limb in each instance;
    each of said first additional partial windings having a first higher-voltage partial winding wound around said first additional partial winding and each said first higher-voltage partial winding having a first traction winding wound around said first higher-voltage partial winding.

7. The electric machine according to claim 1, wherein:
    said second additional partial winding is one of at least two second additional partial windings arranged one behind another along said second limb and wound around said second limb in each instance;
    each of said second additional partial windings having a second higher-voltage partial winding wound around said second additional partial winding and each said second higher-voltage partial winding having a second traction winding wound around said second higher-voltage partial winding.

8. In combination with a vehicle having a vehicle drive to be selectively supplied with electrical energy from an external AC voltage or DC voltage, the electric machine according to claim 1, wherein:
    during AC voltage operation, the external AC voltage is applied to the higher-voltage winding, the additional winding is grounded on one side and otherwise remains electrically unconnected and the traction windings are connected in each instance to a current converter for the vehicle drive; and
    during DC voltage operation, the higher-voltage winding is grounded on one side and otherwise remains electrically unconnected, the additional winding is short-circuited and grounded on one side and the traction windings are connected in each instance as a network filter throttle for a DC voltage drive train of the vehicle drive.

9. The combination according to claim 8, wherein the electric machine has a first DC voltage winding wound around the first traction winding and a second DC voltage winding wound around the second traction winding, wherein the DC voltage windings are grounded on one side during AC voltage operation and otherwise remain electrically unconnected and wherein at least one DC voltage winding is electrically connected in series with a traction winding during DC voltage operation.

10. The combination according to claim 8, wherein the vehicle drive is supplied with electrical energy via a catenary line system during AC voltage operation by way of an external AC voltage and during DC voltage operation with an external DC voltage.

* * * * *